W. COOPER.
CHAIN-PUMP BUCKET.

No. 189,428. Patented April 10, 1877.

WITNESSES
Henry N. Miller,
C. L. Evert

INVENTOR
William Cooper.
Alexander Mason
ATTORNEYS

UNITED STATES PATENT OFFICE.

WILLIAM COOPER, OF YPSILANTI, MICHIGAN.

IMPROVEMENT IN CHAIN-PUMP BUCKETS.

Specification forming part of Letters Patent No. 189,428, dated April 10, 1877; application filed September 23, 1876.

*To all whom it may concern:*

Be it known that I, WILLIAM COOPER, of Ypsilanti, in the county of Washtenaw, and in the State of Michigan, have invented certain new and useful Improvements in Chain-Pump Buckets; and do hereby declare that the following is a full, clear, and exact description thereof, reference being had to the accompanying drawings, and to the letters of reference marked thereon, making a part of this specification.

The nature of my invention consists in the construction and arrangement of a chain-pump bucket, as will be hereinafter more fully set forth.

In order to enable others skilled in the art to which my invention appertains to make and use the same, I will now proceed to describe its construction and operation, referring to the annexed drawing, in which—

Figure 1:
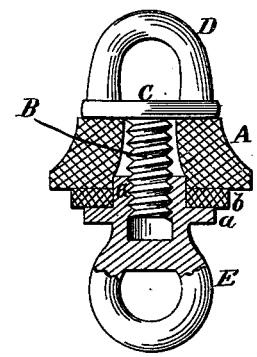
Figure 2:
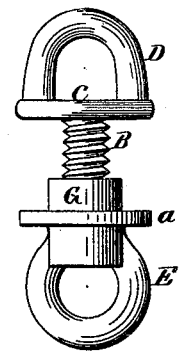

Figure 1 is a section of my bucket. Fig. 2 is a view of the same with the rubber removed.

A represents the rubber, made in the form of a truncated cone, and having its sides slightly concave, as shown. This rubber is placed over a screw, B, which projects from a disk or plate, C, said plate having on its other side a link, D.

E represents another link, formed in one piece with a hollow hub, G, having interior screw-threads and an exterior flange, *a*.

Over the hub G, resting on the flange *a*, is placed a rubber washer, *b*, after which the hub is screwed on the lower end of the screw B, the hub entering the central hole in the rubber A.

The hub G being closed at its lower end, it will be seen that no water can come in to the screw B and corrode the same.

The rubber A can easily be expanded, when worn, by simply screwing the parts closer together.

Having thus fully described my invention, what I claim as new, and desire to secure by Letters Patent, is—

The link E, hollow screw-hub G, and flange *a*, formed of one piece of metal, in combination with the link D, plate C, and screw B, all connected together, the rubber A, and washer *b*, all substantially as and for the purposes herein set forth.

In testimony that I claim the foregoing I have hereunto set my hand and seal this 12th day of September, 1876.

WM. COOPER. [L. S.]

Witnesses:
JAMES WILKES,
M. B. BANKER.